Figure 1:
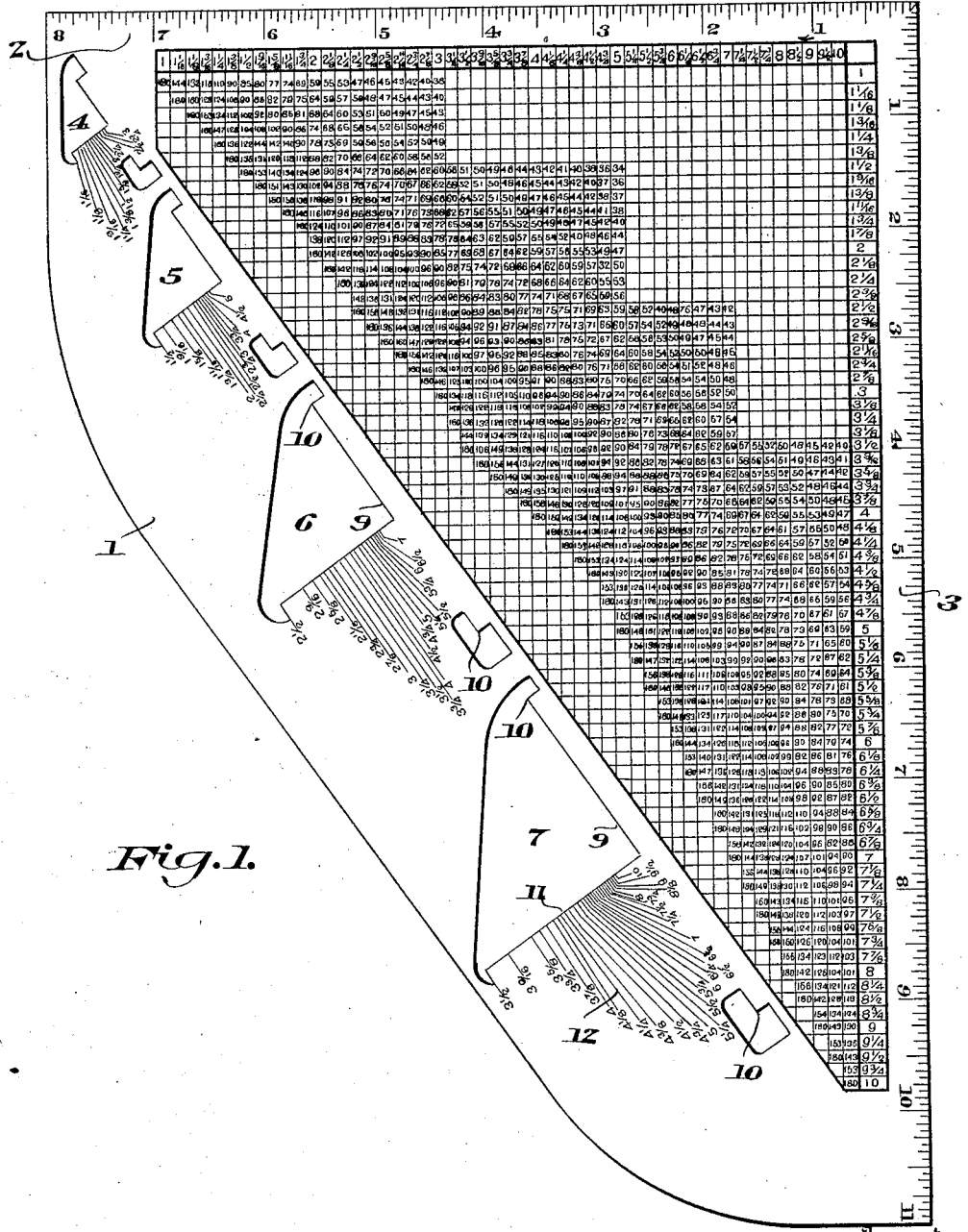

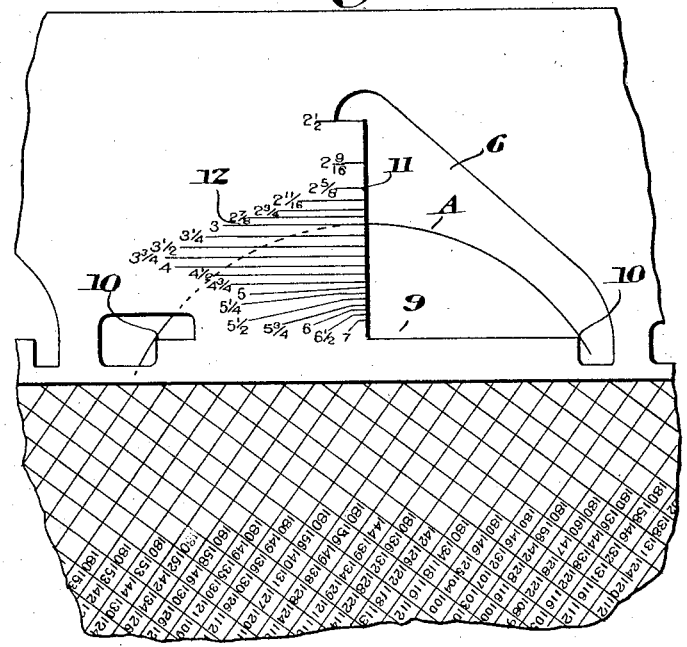
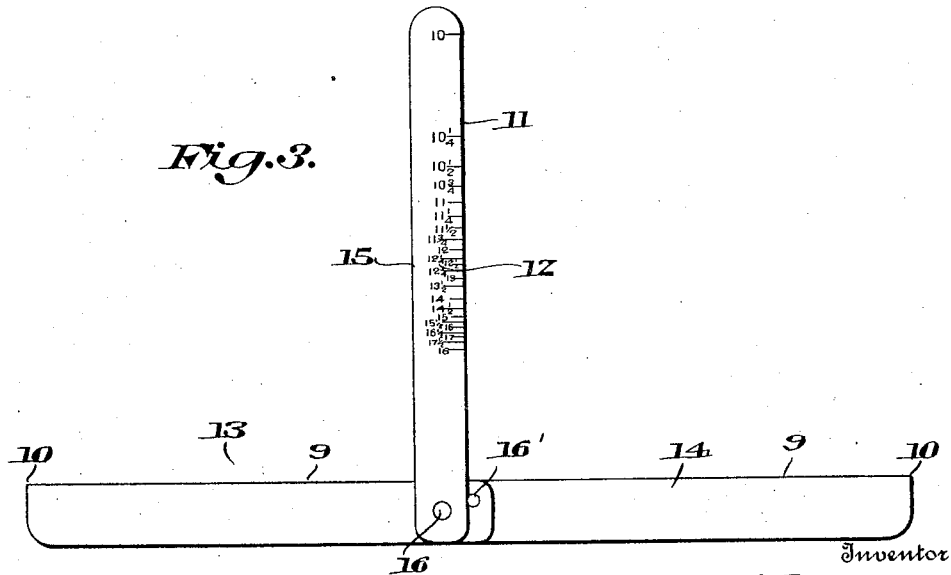

UNITED STATES PATENT OFFICE.

LE ROY J. LEISHMAN, OF OGDEN, UTAH.

MEASURING INSTRUMENT.

1,181,900. Specification of Letters Patent. Patented May 2, 1916.

Application filed October 21, 1914. Serial No. 867,803.

*To all whom it may concern:*

Be it known that I, LE ROY J. LEISHMAN, a citizen of the United States, residing at Ogden, in the county of Weber and State of Utah, have invented new and useful Improvements in Measuring Instruments, of which the following is a specification.

This invention relates to measuring instruments, and particularly to a device whereby the arc of a circle may be measured for the purpose of determining the diameter of the particular circle of which such arc is an arc, and also for the purpose of determining the number of degrees in the arc in question.

The object of the invention is to provide an instrument of the character and for the purpose described whereby the operations stated may be easily and quickly carried out without the necessity of the operator doing any mathematical work whatever.

The invention consists of the features of construction, combination and arrangement of parts herein fully described and claimed, reference being had to the accompanying drawings in which:—

Figure 1 is a face view of a measuring instrument embodying my invention. Fig. 2 is a similar view of a portion of the instrument on an enlarged scale and indicating its mode of use. Fig. 3 is a view of a modified form of instrument.

The instrument comprises a body 1 which is preferably in the form of a substantially triangular plate, of metal, wood, celluloid or any other suitable material. This body portion is provided with a transversely extending diameter scale 2 and a longitudinally extending distance scale 3, the first-named scale containing figures for indicating diameters from 1 to 10 inches, in inches and fractions thereof, while the scale 3 contains a row of numerals for indicating linear distances from 1 to 10 inches in inches and fractions thereof. These scales are arranged along two of the sides of a triangular field or space which is subdivided by sets of lines running at right angles to each other into columns intersecting the diameter and distance numerals, and in which are arranged figures indicating the number of degrees in an arc of a circle of any radius within the measuring range of the instrument.
The body 1 is provided with a plurality of arc and diameter indicators 4, 5, 6 and 7 formed by cutting out portions from a projecting portion 8 of the body, each of said indicators including a diameter measuring line 9 terminating in indicating points 10, a straight edge 11 arranged at right angles to the said line 9, and a diameter scale 12. In the present instance, I have shown the use of four angle indicators, which are arranged upon the longer side or base of the body. The indicators and provided scales thus are graduated scales of different sizes and having different measuring degrees, the distances between the measuring points 10 and the lengths of the scale edges of which vary progressively throughout the series of scales. As shown, each of these arc and diameter indicators has its scale 12 formed of lines intersecting the edge 11 at different distances from the line 9 and leading to angle indicating numerals. These indicating lines are so disposed as to extend tangentially to the arc A of a circle whose diameter is being measured, as illustrated in Fig. 2, illustrating the mode of use of the instrument. It is to be understood, of course, that the diameter indications and scale marks upon the respective arc and diameter indicators are based upon the distances between the indicating points 10, which are designed to indicate and are based upon the chord length of the arc of the circle from the center of which the arc is struck.

The instrument is designed to be placed upon the arc of a circle to indicate the diameter of the particular circle of which such arc is an arc, and also to indicate the number of degrees in the said arc, which operations have heretofore been performed without the use of an instrument and by means of very accurate mathematical work.

The instrument, as shown, measures arcs containing from about 40°, as small as any one ordinarily would ever desire to measure, up to 180°. If the arc contains more than 180°, there would be no need of using the instrument, as the diameter could easily be told by measuring with a rule. The particular instrument illustrated will measure arcs whose circles range from 1 to 10 inches in diameter, but the measuring range of the device may be increased if desired.

In the use of the device for determining the diameter of a particular circle of which any certain arc is an arc, the base line 9 of the proper indicating member is disposed across the arc as shown in Fig. 2, so that its points 10 touch the sides of the arc, and so that the arc will be intersected by one of the tangential scale lines, the numeral associated with which will denote the diameter of the circle of which the arc is an arc. As shown in Fig. 2, the arc illustrated is shown as being an arc of a circle having a diameter of three inches. Of course, it will be understood that the largest of the four measuring scales that may be used upon the arc will be employed. Thus by means of the measuring scales or indicators the diameter of any circle of which any arc is an arc, within the range of the instrument, may be readily and conveniently determined without mathematical calculation.

The scale 12 may also be used for other mathematical calculations such as finding the degrees formed by the hypotenuse and base of a right triangle, by locating the inches and fractions of inches contained in the hypotenuse on the diameter indicating row of figures and the length of the altitude on the distance indicating row, and proceeding as in finding the degrees in an arc.

If it should be desired to find the number of degrees in the arc, the distance between the extremities of the arc along the chord line is measured by means of the rule, on the instrument, and this is followed out by finding the distance indicating figures in the scale 3 and then finding the numeral in the degree table which is disposed at the point of intersection of the distance indicating row of figures and the diameter indicating row of figures, in which space of the table will be found the numeral indicating the number of degrees in the measured arc.

In Fig. 3 of the drawings I have shown a modified construction of instrument, which is adapted to be folded and conveniently carried in the pocket. This instrument comprises a pair of measuring strips or blades 13 and 14, and an indicating strip or blade 15, all of which blades are pivotally connected at one end, as indicated at 16, so that said blades may be folded in parallel relation or the two blades 13 and 14 unfolded in longitudinal alinement and the blade 15 disposed at right angles thereto, thus setting the instrument ready for use. When the blades are unfolded or set for use, the blade 15 abuts against the stop pin 16' carried by the blade 13, when it is arranged in proper relative position to the blades 13 and 14. The alined inner edges of the blades 13 and 14 form the base line 9 having terminal indicating points 10, while one edge of the blade 15 forms a straight edge 11, and said blade is provided with the diameter scale 12. The mode of use of this instrument will be readily understood from the foregoing description.

I claim:—

1. An instrument of the character described comprising a blade formed with a triangular cut-away portion, one of the arms of said portion forming a straight edge and the other an indicating line, said straight edge and indicating line terminating at their relatively outer ends indicating points, said blade being further provided with scale indications along said indicating line for coöperation with the indicating point of the straight edge, and a second indicating point upon the blade on the side of the indicating line opposite to the first-named indicating point.

2. An instrument of the character described comprising a blade provided with a series of graduated scales for indicating the number of degrees in an arc and the diameter of the particular circle of which such arc is an arc, each scale having a certain range of measuremnt, and each comprising triangular cut away portion forming a base line or straight edge and a scale line constituting two of the sides of the said portion, the base line having an indicating point at its end remote from the indicating line, and said blade being provided with graduated degree indicia along the indicating line, and an indicating point upon the blade on the opposite side of the indicating line from the indicating point of the base line.

In testimony whereof I affix my signature in presence of two witnesses.

LE ROY J. LEISHMAN.

Witnesses:
 DAVID JENSON,
 LEO A. HARRIS.

Copies of this patent may be obtained for five cents each, by addressing the "Commissioner of Patents, Washington, D. C."